United States Patent [19]
Martin et al.

[11] Patent Number: 6,029,140
[45] Date of Patent: *Feb. 22, 2000

[54] ON-TIME DELIVERY, TRACKING AND REPORTING

[75] Inventors: Doreen J. Martin; Guy M. Givens, both of Boise; Justin D. Kuttler, Meridian, all of Id.

[73] Assignee: Micron Technology, Inc., Boise, Id.

[*] Notice: This patent is subject to a terminal disclaimer.

[21] Appl. No.: 09/309,060

[22] Filed: May 10, 1999

Related U.S. Application Data

[63] Continuation of application No. 09/137,651, Aug. 20, 1998, Pat. No. 5,960,408, which is a continuation of application No. 08/794,155, Feb. 3, 1997, Pat. No. 5,809,479, which is a continuation of application No. 08/278,183, Jul. 21, 1994, abandoned.

[51] Int. Cl.$^7$ ..................................................... G06F 17/60

[52] U.S. Cl. ............................. 705/11; 235/376; 235/385; 705/28; 705/29

[58] Field of Search .................................. 705/1, 11, 22, 705/24, 28, 29; 235/375, 376, 377, 385

[56] References Cited

U.S. PATENT DOCUMENTS

| | | | |
|---|---|---|---|
| 4,887,208 | 12/1989 | Schneider et al. | 705/28 |
| 5,038,283 | 8/1991 | Caveney | 705/28 |
| 5,117,096 | 5/1992 | Bauer et al. | 235/375 |
| 5,168,445 | 12/1992 | Kawashima et al. | 705/10 |
| 5,465,291 | 11/1995 | Barrus et al. | 379/67.1 |

OTHER PUBLICATIONS

"The Service Edge—For Creating and Maintaining Distinctive Customer Service," Lakewood Publications, Mar. 1993, vol. 6, No. 3, pp. 1–3.

Letter dated Oct. 27, 1992 to selected customers.

Dialog Abstract: File 751, Acc. #00244194; Visual/XL Purchasing/Inventory; Smith, Dennis & Gaylord, Inc.; 1981.

Dialog Abstract: File 6, Acc #1708417; Potvin et al.; "Parallel Route Building Algorithm for the Vehicle Routing and Scheduling Problem with Time Windows", Montreal Univ. (Quebec); c1993; 22p.

Dialog: File 148, Acc #03882150; Zurier; "Delivering Quality Customer Service", *Industrial Distribution*; v78 n3; p30(4); Mar. 1989.

Dialog: File 148, Acc #04838628; Raia; "JIT Delivery: Redefining 'On–time'"; *Purchasing*; v109 n3; p64(7); Sep. 13, 1990.

(List continued on next page.)

*Primary Examiner*—Stephen R. Tkacs
*Attorney, Agent, or Firm*—Wells, St. John, Roberts, Gregory & Matkins, P.S.

[57] ABSTRACT

A computer system is programmed for setting and reporting product delivery dates. The invention includes a step of maintaining a customer preferences database having delivery and reporting preferences for individual customers. The preferences include preferred early and late delivery limits, preferred performance measurement species, and desired advance delivery times. The invention further includes a step of creating a customer order entry for a particular customer. The customer order entry includes a customer-requested delivery date supplied by the customer. A customer-preferred ship date is calculated for the customer order entry based at least in part upon the customer-requested delivery date and at least in part upon the particular customer's specified desired advance delivery time. The customer order entry is then routed to an order scheduler. The computer system shows the order scheduler the calculated customer-preferred ship date and obtains a targeted ship date for the customer order entry from the order scheduler. The system is programmed to then calculate a targeted ship date window based upon the targeted ship date and the particular customer's preferred early and late delivery limits. On-time product delivery statistics are generated for individual customers in accordance with the individual customers' specified preferred performance measurement species.

21 Claims, 1 Drawing Sheet

OTHER PUBLICATIONS

Dialog Abstract: File 15, Acc #00522133; Bowman; "Using 3$^{rd}$ Parties for International Success: Target Stores"; *Distribution*; v89 n10; pp. 78, 80; Oct. 1990.

Dialog: File 148, Acc #05578823; Richardson; "T&D Recognizes Excellence in Logistics"; *Transportation & Distribution*; v32 n12; p27(5); Dec. 1991.

Dialog: File 16, Acc #04289714; Miller; "Don't Let 'Undependable' Suppliers Bug You: Five Principles to Help Boost the Rate of On–time Deliveries"; *Electronics Buyer's News*; Feb. 1, 1993, p. 14.

Dialog: File 16, Acc #04613164; Miller; The Key to Recognition is Teamwork; *Electronic Buyer's News*; Aug. 2, 1993l p. 5.

Dialog Abstract: File 751, Acc #00258029; Macola Purchase Order and Receiving 6.0; Macola Software; First Installed: 1993.

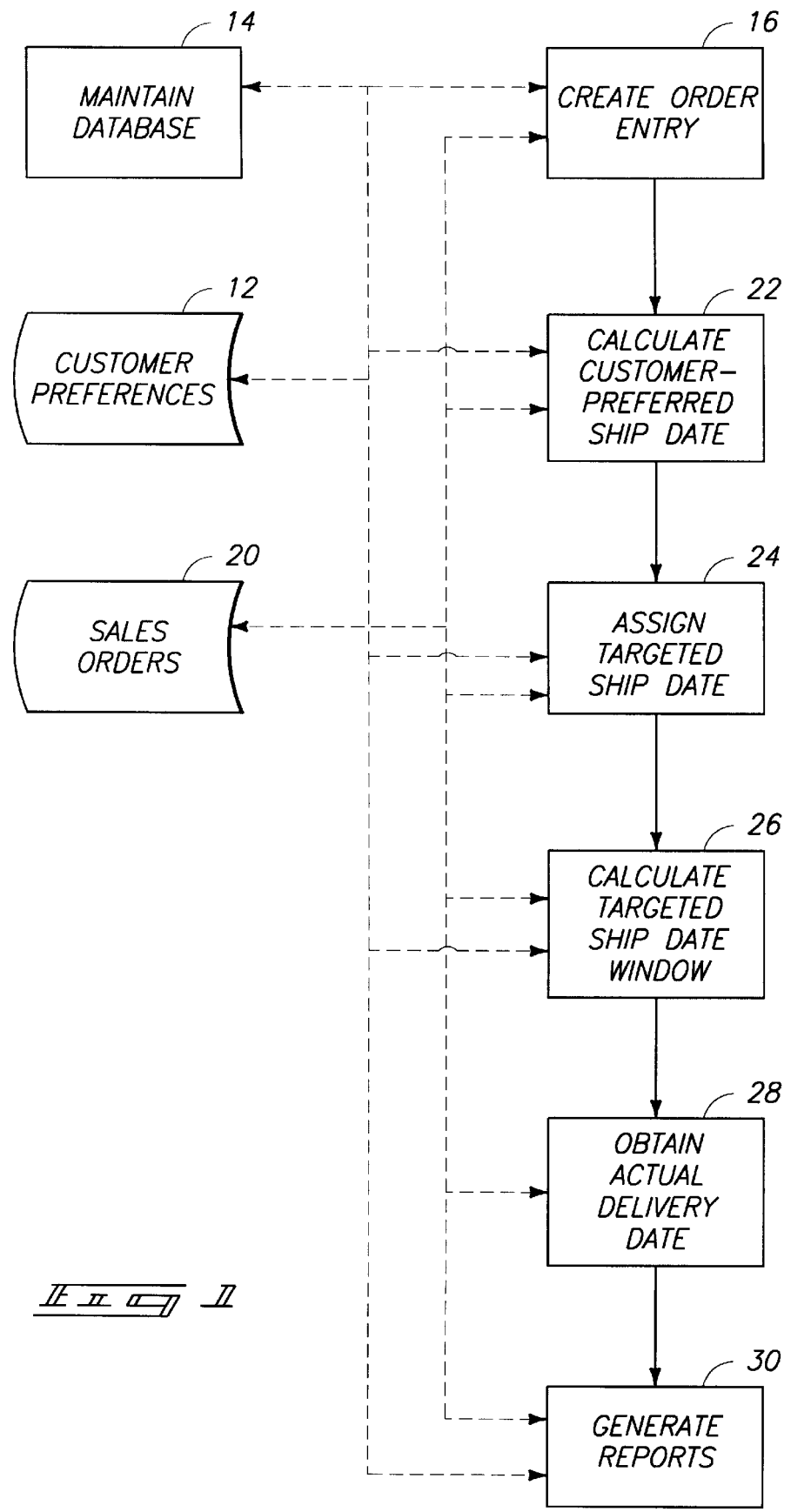

ON-TIME DELIVERY, TRACKING AND REPORTING

CROSS REFERENCE TO RELATED APPLICATION

This is a Continuation of U.S. patent application Ser. No. 09/137,651, filed Aug. 20, 1998, and titled "On-Time Delivery, Tracking and Reporting", now U.S. Pat. No. 5,960,408 which in turn is a Continuation of U.S. patent application Ser. No. 08/794,155, filed Feb. 3, 1997, now U.S. Pat. No. 5,809,479, which in turn is a Continuation of U.S. patent application Ser. No. 08/278,183, filed Jul. 21, 1994, now abandoned.

TECHNICAL FIELD

This invention relates to customer order entry and delivery tracking systems.

BACKGROUND OF THE INVENTION

Service quality has become almost as important to many customers as the quality of supplied goods. More and more, customers tend to make purchasing decisions based upon service performance of suppliers. Thus, it has become very important for suppliers to evaluate their own service performance and to provide the results of such evaluations to customers. Suppliers and their customers often cooperate to evaluate service performance.

On-time product delivery is an important service component of many high-volume supply businesses. A customer typically orders a product for delivery on a specified date. The customer expects that the delivery will be no later than that date. However, the customer also does not want the delivery to be too early. The customer considers the delivery to be on time only if it is within an on-time window.

Each customer typically uses its own criteria to calculate the on-time window. For instance, one customer might consider a delivery to be on time if it is no earlier than five days and no later than one day from the requested delivery date. Another customer might consider a delivery to be on time if it is no earlier than four days and no later than the requested delivery date. The fact that each customer uses its own criteria makes it difficult for a supplier to evaluate its own performance. In fact, there are several other variable criteria which make the task of evaluation even more difficult for the supplier.

For instance, different customers use different performance measurement species or calculation units in calculating delivery performance. One customer might use dollar amounts as the measurement species. In such a case, an on-time evaluation would compare the dollar value of on-time items with the dollar value of items which were not on time. Another customer might use product units as a measurement basis. The on-time evaluation would indicate the number of product units delivered on time compared to the number of product units delivered too early or late. A third customer might use order line items or discrete shipments as a statistical calculation basis. The on-time evaluation would indicate the number of on-time shipments compared to the number of other shipments. Variations or averages based on the above schemes might also be used. Furthermore, some customers allow partial on-time credit for partial shipments, while other customers consider a particular order to be late if any part of the order is delivered late.

As another example of varying customer evaluation criteria, some customers equate a "delivery date" with an actual ship date. When such customers request a particular delivery date, they are referring to the day the shipment leaves the supplier's dock. Other customers equate the "delivery date" with the dock date-the date the shipment actually arrives at the customer's dock.

As a further specific example, certain companies might include weekends and holidays in their early and late calculations, while other companies exclude weekends and holidays. Other variable on-time evaluation criteria, not discussed, can of course be used by individual companies.

The highly variable nature of the criteria used to evaluate supplier performance and to compile on-time delivery statistics makes it very difficult for a supplier to either perform to the customers' varying expectations or to even evaluate whether performance expectations are being met. The invention described below addresses this problem. The invention helps a supplier set targeted delivery dates and goals within each customer's expectations, while also providing a statistical analysis of on-time deliveries in accordance with each customer's own evaluation preferences.

BRIEF DESCRIPTION OF THE DRAWINGS

FIG. 1 is a computer flow chart and system diagram which illustrates a preferred embodiment of the invention. Solid lines indicate process flow. Dashed lines indicate data transfer between specific processes and physical data storage devices.

DETAILED DESCRIPTION OF THE PREFERRED EMBODIMENT

This disclosure of the invention is submitted in furtherance of the constitutional purposes of the U.S. Patent Laws "to promote the progress of science and useful arts." U.S. Constitution, Article 1, Section 8.

The invention is an on-time delivery tracking and reporting computer system which maintains customer order and delivery information. The computer system implements a method of both setting and reporting product delivery dates in accordance with individual customers' expectations. The computer system includes a conventional data processor which is programmed using conventional programming techniques to perform the functions described below. The programmed data processor thus forms means for accomplishing the described functions.

FIG. 1 is a flow chart and system diagram showing a preferred embodiment of the invention. The invention includes a customer preferences database 12 having delivery and reporting preferences for individual customers of a particular supplier. The invention also includes an independent step 14 of maintaining customer preferences database 12. Database maintenance is typically performed by customer service representatives of the supplier, from within the supplier's order processing computer system.

The delivery and reporting preferences contained within database 12 include preferred early and late delivery limits, preferred performance measurement species, and desired advance delivery times. The early and late delivery limits specify, for individual customers, on-time windows relative to delivery dates which are requested or expected by the individual customers. The preferred performance measurement species indicate, for individual customers, the customer-preferred bases for statistical measurements— whether the customers measure performance in terms of dollars, units, line items, or shipments. The desired advance delivery times indicate, for individual customers, the number of days by which the customers prefer their orders to be early. For instance, a particular customer might specify early and late delivery limits of five and zero days respectively. However, the customer might prefer a delivery date of two days early. The desired advance delivery time indicates this preference.

Customer preferences database 12 further includes ship/dock flags for individual customers to indicate whether said customers consider delivery dates for particular products to be ship dates (the dates the products leave the suppliers' sites) or dock dates (the dates the products arrive at the customers' sites). Days-in-week variables in the delivery and reporting preferences specify the number of days counted in each week by particular customers. These variables are generally used to indicate whether particular suppliers count weekends in their on-time calculations.

The delivery and reporting preferences of database 12 also include partial shipment allowed flags for respective customers, indicating whether the customers give credit for on time delivery of partial shipments. The delivery and reporting preferences further include customer-preferred reporting periods, indicating the preferred reporting intervals for individual customers.

Other customer preferences might also be included in database 12, indicating such information as whether customers will allow rescheduling of shipments, calendar holidays for each customer, and/or calendar holidays for the supplier. Customer preferences database 12 will preferably be updated at least once every year for each customer, or as otherwise determined to be needed. The system is programmed to prompt customer service representatives whenever updating is needed, based upon programmed updating periods which are initially specified by the customer service representatives.

The preferred embodiment of the invention includes a step 16 of creating a customer order entry for a particular customer. The computer system is programmed to reference customer preferences database 12 during the order entry process to set preferable delivery dates for individual customers. These dates are based upon customer-requested delivery dates supplied by the customers. Individual customer order entries are created and stored in a sales orders database 20.

The invention includes a step 22 of calculating a customer-preferred ship date for the customer order entry based at least in part upon the customer-requested delivery date and at least in part upon the particular customer's specified preferences as maintained in customer preferences database 12. More specifically, step 22 includes a step of subtracting the customer's desired advance delivery time from the customer-requested delivery date to arrive at the customer-preferred ship date. Step 22 also includes checking the customer's ship/dock flag, and then pre-dating the customer-preferred ship date if the customer's ship/dock flag indicates that the particular customer considers a delivery date to be a dock date rather than a ship date. The customer-preferred ship date would be pre-dated in this case by the expected shipping time requirements to the customer's site. The resulting customer-preferred ship date would represent the date the customer order would have to leave the supplier's site to arrive at the customer's site on the date preferred by the customer.

The information entered so far relates only to the customers' requested delivery dates. In some cases, it might not be possible for the supplier to meet a requested or preferred date. Accordingly, the customer order entry is routed to a human order scheduler for assignment of a targeted ship date, as indicated in FIG. 1 by block 24. Based upon the information contained in customer preferences database 12 and sales orders database 20, the computer system is programmed to show the order scheduler the calculated customer-preferred ship date and to obtain from the scheduler a targeted ship date for the customer order entry. This date may or may not correspond to the customer-preferred ship date. Regardless, all dates are recalculated based on the targeted ship date, and a customer-expected delivery date is established in sales orders database 20 and communicated to the customer. The customer-expected delivery date accounts for customer preferences variables as discussed above. More specifically, the customer-expected delivery date is calculated by adding a shipping delay to the targeted ship date, depending on the status of the customer's ship/dock flag, and by also adding the customer's desired advance delivery time to the targeted ship date.

In a further step 26, the computer system is programmed to calculate a targeted ship date window based upon the targeted ship date and the particular customer's preferred early and late delivery limits. The targeted ship date window is obtained by simply subtracting and adding, respectively, the early and late delivery limits from the targeted ship date. The targeted ship date window gives the range of actual ship dates which will result in an on time delivery to the customer, based upon the customer's own rules. The sales order entries, including targeted ship dates, are thus completed with information obtained both from each order entry and from information stored on a long-term basis in customer preferences database 12.

As an example of the order entry process, suppose a customer requests delivery of a shipment on March 17. The customer preferences database for that customer indicates early and late delivery limits of four and zero days, respectively. Delivery dates are specified in terms of dock dates, as indicated by the customer's ship/dock flag. The customer's desired advance delivery time indicates that the customer prefers deliveries to be two days early. Order entry personnel select 2nd day air delivery.

The order is routed to a scheduler who is shown a customer-preferred shipment date of March 13, which accounts for two day delivery and the customer's desired advance delivery time of two days. The scheduler realizes that the shipment cannot be made on that date, and enters a targeted ship date of March 22. A customer-expected delivery date of March 26 is then calculated by adding the delivery delay and the customer's desired advance delivery time to the targeted ship date. The customer-expected delivery date is communicated to the customer, which then uses this date for purposes of on-time measurements.

Once delivery has taken place, the computer system is programmed in a step 28 to obtain actual delivery dates for each shipment. If ship dates are being used as delivery dates by a particular customer, ship dates as obtained from the supplier's own records are used as delivery dates. If customer dock dates are being used instead as delivery dates, such dock dates can be obtained either from the customer or from the carrier. Electronic data interchange (EDI) can be used in either case to obtain the necessary data. The actual delivery dates are stored in sales orders database 20.

After obtaining delivery dates, the computer system in accordance with the invention is programmed in a step 30 to generate on-time product delivery statistics for individual customers. The determination of whether a particular product delivery is on time is based upon the customer-expected delivery date and upon the customer's preferred early and late delivery limits. Step 30 includes generating statistical reports for each customer. The reports are generated periodically, for each customer, based upon that customer's specified reporting periods. For instance, some customers might require weekly reports, while other customers desire only monthly reports.

Each report is formatted in accordance with an individual customer's specified preferred performance measurement species. For instance, if customer preferences database 12 indicates that a particular customer measures performance in terms of dollars, the report for that customer might appear as follows:

| Total Dollar Shipments | $1,000,000 |
|---|---|
| On-time Shipments | $700,000 |
| Percentage On-Time | 70% |

However, if the same customer measures performance in terms of actual units, the report for that customer might appear as follows:

| Total Units Shipped | 300,000 |
|---|---|
| On-time Units | 200,000 |
| Percentage On-Time | 67% |

If the customer measures performance in terms of shipments or line items, the report might appear as follows:

| Total Shipments | 10 |
|---|---|
| On-time Shipments | 8 |
| Percentage On-Time | 80% |

The determination of whether a particular product delivery is on time is based upon the supplier's targeted ship date window when the customer's ship/dock flag indicates that customer equates delivery dates with actual ship dates. When delivery dates specify dock dates, the determination is based upon a window calculated from the customer-expected delivery date and upon the early and late delivery limits. In either case, the determination is also based upon the customer's days-in-week variable. Furthermore, in compiling the reports, the computer system is programmed to count a partial delivery which is on time as a fraction of an on-time delivery if a customer's partial shipment allowed flag indicates that the customer allows partial on-time shipments to be counted in on-time statistics.

Once deliveries have been completed, it is also desirable to determine and document the reasons for any deliveries which were not on time. Accordingly, provisions are provided for recording reasons for late shipments or for shipments which have to be rescheduled.

The system and program described above allow a supplier to easily measure its performance using the same evaluation criteria used by its customers. This not only helps the supplier perform to the customer's expectations, but provides an additional service to customers in the form of on-time reports in the formats needed and actually used by the customers. Furthermore, the system allows the supplier to take advantage of customers' delivery windows. Rigid internal rules, which did not account for individual customers, had previously prevented this. It is anticipated that the system will increase supplier performance, particularly in allowing the supplier to provide a higher percentage of on-time deliveries.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. An article of manufacture including a computer usable medium having computer readable program code embodied therein for maintaining customer order and delivery information for customers, the computer readable program code being configured to:

store ship/dock information for respective customers to indicate whether the customers consider delivery dates for particular products to be ship dates or dock dates;

store desired advance delivery times for individual customers;

create a customer order entry for a particular customer, the customer order entry including a customer-requested delivery date supplied by the particular customer;

calculate a customer-preferred ship date for the customer order entry based at least in part upon the customer-requested delivery date;

communicate the calculated customer-preferred ship date to an order scheduler;

is obtain a targeted ship date for the customer order entry from the order scheduler; and calculate a customer expected delivery date by adding data representing anticipated shipping delay to the targeted ship date, taking into consideration whether the customer defines delivery dates to be ship dates or dock dates, and by also adding the customer's desired advance delivery time to the targeted ship date.

2. An article of manufacture as recited in claim 1, the computer readable program code being further configured to store preferred performance measurement species for individual customers, and to generate on-time product delivery statistics for individual customers in accordance with the individual customers' specified preferred performance measurement species.

3. An article of manufacture as recited in claim 1, the computer readable program code being further configured to store days-in-week variables for individual customers, and determine whether the product delivery is on-time based at least in part upon the customer's days-in-week variable.

4. An article of manufacture as recited in claim 1, the computer readable program code being further configured to store partial shipment allowed flags for individual customers, and count a partial delivery which is on time as a fraction of an on-time delivery if a customer's partial shipment allowed flag indicates that said customer allows partial on-time shipments to be counted in on-time statistics.

5. An article of manufacture as recited in claim 1, the computer readable program code being further configured to store reporting periods for individual customers, and generate on-time product delivery statistics periodically for a particular customer based upon that customer's specified reporting periods.

6. An article of manufacture as recited in claim 1, the computer readable program code being further configured to obtain actual dock dates for individual product deliveries, wherein determining whether the particular product delivery is on time is based upon that delivery's actual dock date.

7. An article of manufacture as recited in claim 1, the computer readable program code being further configured to obtain actual dock dates for individual product deliveries through electronic data interchange with carriers, wherein determining whether the particular product delivery is on time is based upon that delivery's actual dock date.

8. A method of setting and reporting product delivery dates comprising:

storing, in a computer usable medium, preferences for individual customers, said preferences including preferred early and late delivery limits, and data indicating whether the customer defines delivery dates to be ship dates or dock dates;

creating a customer order entry, in a computer usable medium, for a particular customer, said customer order entry including a customer-requested delivery date supplied by said particular customer;

calculating a customer-preferred ship date for the customer order entry based at least in part upon the customer-requested delivery date;

routing the customer order entry to an order scheduler;

showing the order scheduler the calculated customer-preferred ship date;

obtaining a targeted ship date for the customer order entry from the order scheduler;

calculating a targeted ship date window based upon the targeted ship date and the particular customer's preferred early and late delivery limits; and calculating a customer expected delivery date by adding data representing anticipated shipping delay to the targeted ship date, and taking into consideration whether the customer defines delivery dates to be ship dates or dock dates.

9. A method of setting and reporting product delivery dates as recited in claim 8 and further comprising generating on-time product delivery statistics for individual customers by determining whether a particular product delivery is on time based upon the individual customers' preferred early and late delivery limits.

10. A method of setting and reporting product delivery dates as recited in claim 8 and further comprising storing days-in-week variables for individual customers, and determining whether the product delivery is on-time based at least in part upon the customer's days-in-week variable.

11. A method of setting and reporting product delivery dates as recited in claim 8 and further comprising storing partial shipment allowed flags for individual customers, and counting a partial delivery which is on time as a fraction of an on-time delivery if a customer's partial shipment allowed flag indicates that said customer allows partial on-time shipments to be counted in on-time statistics.

12. A method of setting and reporting product delivery dates as recited in claim 8 and further comprising storing reporting periods for individual customers, and generating on-time product delivery statistics periodically for a particular customer based upon that customer's specified reporting periods.

13. A method of setting and reporting product delivery dates as recited in claim 8 and further comprising obtaining actual dock dates for individual product deliveries.

14. An article of manufacture including a computer usable medium having computer readable program code embodied therein to:

store preferences for individual customers, said preferences including preferred early and late delivery limits, and data for individual customers to indicate whether the customers consider delivery dates for particular products to be ship dates or dock dates;

create a customer order entry for a particular customer, said customer order entry including a customer-requested delivery date supplied by said particular customer;

calculate a customer-preferred ship date for the customer order entry based at least in part upon the customer-requested delivery date and at least in part upon the customer preferences for the particular customer;

show the calculated customer-preferred ship date to an order scheduler;

input a targeted ship date for the customer order entry from the order scheduler;

calculate a customer expected delivery date by adding data representing anticipated shipping delay to the targeted ship date, taking into consideration whether the customer defines delivery dates to be ship dates or dock dates; and determine whether a particular product delivery is on time, based upon the particular customer's preferred early and late delivery limits.

15. An article of manufacture as recited in claim 14 wherein the computer readable program code is configured to store days-in-week variables for individual customers, and to determine whether the product delivery is on-time based at least in part upon the customer's days-in-week variable.

16. An article of manufacture as recited in claim 14 wherein the computer readable program code is configured to store partial shipment allowed flags for individual customers, and to count a partial delivery which is on time as a fraction of an on-time delivery if a customer's partial shipment allowed flag indicates that said customer allows partial on-time shipments to be counted in on-time statistics.

17. An article of manufacture as recited in claim 14 wherein the computer readable program code is configured to store reporting periods for individual customers, and to generate on-time product delivery statistics periodically for a particular customer based upon that customer's specified reporting periods.

18. An article of manufacture as recited in claim 14 wherein the software is configured to store desired advance delivery times for individual customers, and to calculate the customer-preferred ship date based at least in part upon the particular customer's specified desired advance delivery time.

19. An article of manufacture as recited in claim 14 wherein the software is configured to store actual dock dates for individual product deliveries, and to determine whether the particular product delivery is on time based upon that delivery's actual dock date.

20. An article of manufacture including a computer usable medium having computer readable program code embodied therein to:

determine and store data representing a customer's early and late delivery limits for deliveries;

determine and store whether the customer defines delivery date as shipped date or received date for deliveries;

determine and store whether the customer includes weekends and holidays in evaluating whether a delivery is on-time;

determine and store how performance is measured by the customer;

determine and store the customer's desired advance delivery time;

determine and store whether the customer considers a partial shipment in determining on-time delivery;

determine and store the customer's preferred reporting period;

receive an order from the customer for a particular delivery, and receive a requested delivery date;

calculate the customer's preferred ship date as being the customer's requested delivery date minus the customer's desired advance delivery;

send the customer's preferred ship date to a human order scheduler;

receive a targeted ship date from the human order scheduler;

calculate a customer expected delivery date by adding data representing anticipated shipping delay to the targeted ship date, taking into consideration whether the customer defines delivery dates to be ship dates or dock dates, and by also adding the customer's desired advance delivery time to the targeted ship date;

receive the actual delivery date for the particular delivery;

generate delivery statistics according to th e customer's reporting period, taking into consideration how performance is measured by the customer, whether the customer defines delivery dates to be ship dates or dock dates, and whether the customer includes weekends and holidays in evaluating whether a delivery is on-time; and record reasons for deliveries which were not on time.

21. A method of setting and reporting product delivery dates the method comprising:

storing in a computer usable medium, for individual customers, preferred early and late delivery limits, preferred performance measurement species, and desired advance delivery times;

storing, in a computer usable medium, reporting periods for individual customers;

creating a customer order entry for a particular customer, said customer order entry including a customer-requested delivery date supplied by said particular customer;

calculating a customer-preferred ship date for the customer order entry based at least in part upon the customer-requested delivery date and at least in part upon the particular customer's specified desired advance delivery time;

routing the customer order entry to an order scheduler;

showing the order scheduler the calculated customer-preferred ship date;

obtaining a targeted ship date for the customer order entry from the order scheduler;

storing ship/dock flags for individual customers to indicate whether said customers consider delivery dates for particular products to be ship dates or dock dates;

calculating a customer expected delivery date by adding data representing anticipated shipping delay to the targeted ship date, taking into consideration whether the particular customer considers a delivery date to be a ship date or dock date, and by also adding the customer's desired advance delivery time to the targeted ship date;

storing days-in-week variables for individual customers;

storing partial shipment allowed flags for individual customers;

obtaining actual dock dates for individual product deliveries; and generating on-time product delivery statistics for individual customers in accordance with the individual customers' specified preferred performance measurement species and based upon that customer's specified reporting periods.

* * * * *

UNITED STATES PATENT AND TRADEMARK OFFICE
CERTIFICATE OF CORRECTION

PATENT NO.   : 6,029,140
DATED        : February 22, 2000
INVENTOR(S)  : Doreen Martin, Guy Givens, and Justin Kuttler It is certified that error appears in the above-identified patent and that said Letters Patent are hereby corrected as shown below:

Column 6, line 35, delete "is".

Column 9, line 25, replace "th e customer's" with --the customer's--.

Signed and Sealed this

Fifteenth Day of May, 2001

Attest:

NICHOLAS P. GODICI

Attesting Officer   Acting Director of the United States Patent and Trademark Office